US007901615B2

(12) United States Patent
Behloul et al.

(10) Patent No.: US 7,901,615 B2
(45) Date of Patent: Mar. 8, 2011

(54) MOULDING DEVICE AND PRODUCTION PROCESS

(75) Inventors: Mouloud Behloul, Chaville (FR); Sylvain Quidant, Plombière les Dijon (FR)

(73) Assignee: Lafarge, Paris (FR)

( * ) Notice: Subject to any disclaimer, the term of this patent is extended or adjusted under 35 U.S.C. 154(b) by 12 days.

(21) Appl. No.: 12/513,900

(22) PCT Filed: Oct. 30, 2007

(86) PCT No.: PCT/FR2007/001794

§ 371 (c)(1), (2), (4) Date: May 7, 2009

(87) PCT Pub. No.: WO2008/056065

PCT Pub. Date: May 15, 2008

(65) Prior Publication Data

US 2009/0309272 A1 Dec. 17, 2009

(30) Foreign Application Priority Data

Nov. 8, 2006 (FR) .................................... 06 09747

(51) Int. Cl.
*B29C 51/00* (2006.01)
*B29C 51/10* (2006.01)

(52) U.S. Cl. ......................... 264/571; 264/319; 264/320

(58) Field of Classification Search ........................ None
See application file for complete search history.

(56) References Cited

U.S. PATENT DOCUMENTS

| | | | | |
|---|---|---|---|---|
| 4,521,172 | A * | 6/1985 | Gilbert | 425/73 |
| 4,936,939 | A * | 6/1990 | Woolum | 156/285 |
| 5,296,187 | A | 3/1994 | Hackman | |
| 5,932,256 | A | 8/1999 | Mandish | |
| 2007/0163470 | A1 * | 7/2007 | Chanut et al. | 106/724 |

FOREIGN PATENT DOCUMENTS

| | | |
|---|---|---|
| EP | 0 518 777 | 12/1992 |
| EP | 0 934 915 | 8/1999 |
| WO | WO 95/01316 | 1/1995 |
| WO | WO 95/01317 | 1/1995 |
| WO | WO 99/23046 | 5/1999 |
| WO | WO 99/28267 | 6/1999 |
| WO | WO 99/58468 | 11/1999 |
| WO | WO 01/58826 | 8/2001 |
| WO | WO 2006/048652 | 5/2006 |

* cited by examiner

*Primary Examiner* — Monica A Huson
(74) *Attorney, Agent, or Firm* — Pillsbury Winthrop Shaw Pittman, LLP

(57) ABSTRACT

A production process includes providing an envelope and a mould, introducing the material to be moulded in the mould, placing the mould in the envelope, creating a low pressure in the envelope, and deforming the mould.

20 Claims, 2 Drawing Sheets

MOULDING DEVICE AND PRODUCTION PROCESS

CROSS-REFERENCE TO RELATED APPLICATIONS

This is the U.S. National Stage of PCT/FR2007/001794, filed Oct. 30, 2007, which in turn claims priority to French Patent Application No. 0609747, filed Nov. 8, 2006, the entire contents of both applications are incorporated herein by reference in their entireties.

FIELD

This invention relates to a moulding device and a production process.

BACKGROUND

The document WO2006/048652 describes a mould used to make decorations on architectural or civil engineering structures. The mould comprises a plurality of plates forming a grid of plates and at least one actuator to move the plates that are mounted rotatably around orthogonal axes perpendicular to the direction of movement in such a way that the plates together form a desired shape which is the negative of an article to be moulded.

SUMMARY

There is a need for another solution to make decoration motifs.

For this the invention provides a moulding device comprising an envelope, a mould, the mould being in the envelope, a vacuum port to create a low pressure in the envelope, a deforming member for the mould.

According to one variant, the device further comprises a film in the envelope.

According to one variant, the device further comprises two films in the envelope, one film being above and one film being below the mould.

According to one variant, the device further comprises a film in the mould.

According to one variant, the deforming member is under the mould.

According to one variant, the deforming member acts on the envelope.

According to one variant, the deforming member comprises a jack.

According to one variant, the device further comprises a table, the envelope being on the table and the deforming members extending through the table.

According to one variant, the device further comprises ball joints between the deforming members and the envelope.

According to one variant, the deforming member is a template.

The invention also provides a production process comprising the steps of providing an envelope and a mould; introducing material to be moulded into the mould; placing the mould into the envelope; creating a low pressure in the envelope; deforming the mould.

According to one variant, one or more films are disposed in the envelope, between the envelope and the mould.

According to one variant, after introduction of the material in the mould, a film is placed between the material to be moulded and the mould.

According to one variant, the process comprises the provision of a deforming member selected from the group consisting of a jack and a template.

According to one variant, the process is repeated in such a way as to obtain a number of moulded parts, the process then comprising a step of assembling the moulded parts.

According to one variant, the material to be moulded is as described in the following.

According to one variant, the process effected by the device is as previously described.

BRIEF DESCRIPTION OF THE DRAWINGS

Other characteristics and advantages of the invention will appear by reading the detailed description that follows of the embodiments of the invention, given only by way of example and referring to the drawings which show.

DETAILED DESCRIPTION

The invention provides a moulding device comprising an envelope and a mould in the envelope; a vacuum port to form a vacuum in the envelope and a deforming member to deform the mould. The device makes it possible to obtain the moulding of a part in a random shape and in a simple manner. A part is thus obtained whose shape may serve as a decorative motif.

Figure 1:
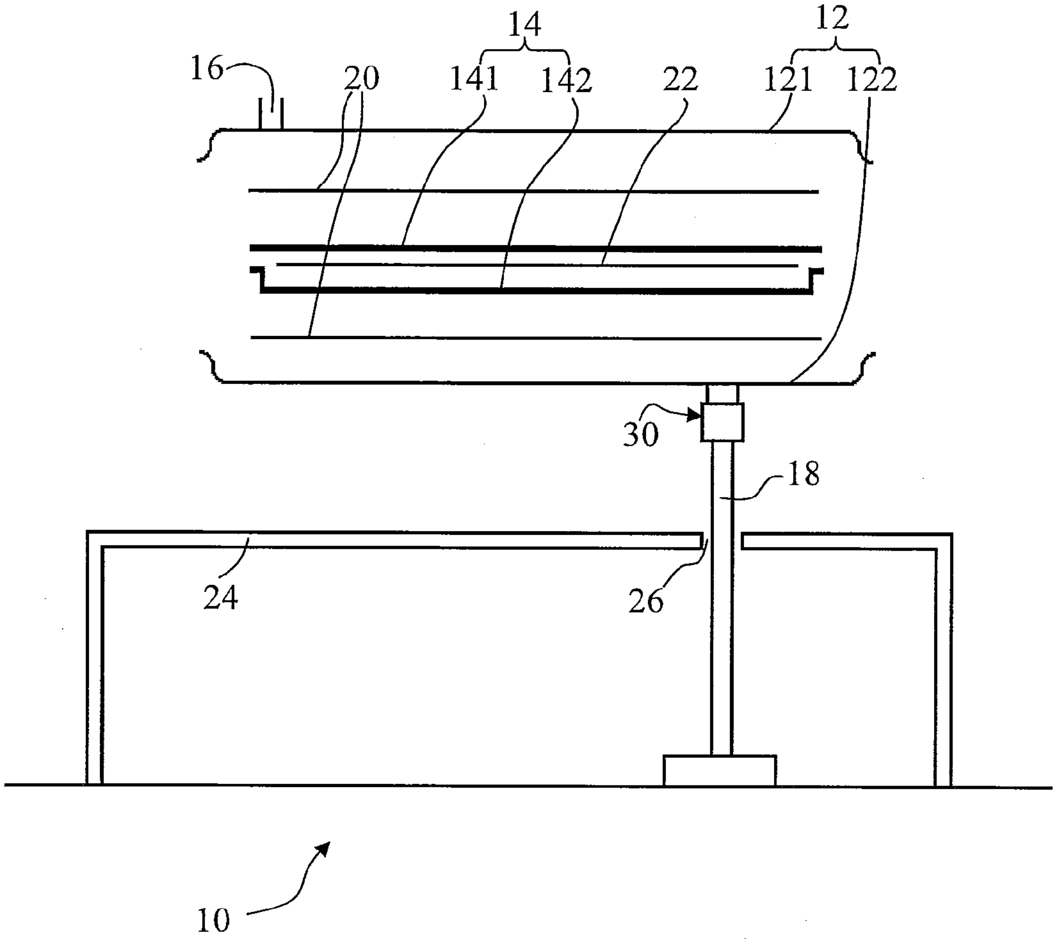
FIG. 1, a diagrammatic representation of the moulding device in profile.

FIG. 1 shows a diagrammatic representation of the moulding device 10 in profile. The device 10 makes it possible to mould parts and at the same time give them a specific shape. In particular, the device 10 makes it possible to produce linings with aesthetic forms for architectural or civil engineering structures. The device makes it possible to produce parts with aesthetic forms with an initial material of the concrete type.

The device 10 comprises an envelope 12 and a mould 14; the mould 14 is in the envelope 12. The mould is adapted to receive the material used to produce parts, for example concrete. The device 10 also comprises a vacuum port 16 to create a low pressure in the envelope 12. The low pressure in the envelope makes it possible to rigidify the device sufficiently so that the material to be moulded does not shift inside the mould when the mould is submitted to deformation; the material remains at a constant thickness. The low pressure allows the component parts of the moulding device to become integral. In particular, the envelope 12 and/or the mould 14 may each be provided with two lips on their periphery and which enter into suction with each other under the effect of the low pressure; these lips ensure in a simple manner the closing of the envelope 12 and the mould 14 respectively. It is then possible to avoid using mechanical closing means. The lips may also be made with a fold on one of the lips and a neck on the other lip, the low pressure causing penetration of the fold into the neck so as to improve the leak proofness of the envelope 12 and/or the mould 14.

The advantage of creating a low pressure within the envelope makes it possible to avoid pumping the material which is located in the mould. Indeed, by the vacuum port, the air imprisoned in the envelope is aspirated; if the vacuum port made it possible to create directly a low pressure in the mould, the material to be moulded would also risk being pumped. Thus, the mould makes it possible to confine the material inside the envelope, and at the same time ensures the creation of a low pressure in the envelope.

The device may also comprise low pressure members to create the low pressure within the envelope. The low pressure members are connected to the vacuum port. By way of example one may create a low pressure from −0.5 to −1.5 bars, preferably from −0.8 to −1.1 bars, for example, −0.9 bars.

The envelope 12 comprises for example an upper part 121 and a lower part 122. The mould 14 is disposed between the lower 122 and upper 121 parts. The mould rests on the lower part 122. The envelope 12 makes it possible to sandwich the mould 14 in a simple manner. It is only necessary to place the mould on the lower part 122 and to close the envelope using the upper part 121, the upper part acting as a cover. The envelope 12 is preferably of a supple material. The suppleness of the envelope makes it possible for the latter to deform under the action of the deforming member of the mould. The envelope is also supple to favour the low pressure in the envelope; the suppleness of the envelope also allows the envelope to take on the shape of the mould under the effect of the low pressure. For example, the envelope is of silicone.

The mould 14 may comprise an upper shell 141 and a lower shell 142. The lower shell 142 of the mould 14 rests on the lower part 122 of the envelope 12. The mould 14 makes it possible to confine the material to be moulded in a simple manner; the material is distributed on the lower shell 142 of the mould, then the mould 14 is closed by the upper shell 141. The mould is preferably of a supple material. The suppleness of the mould 14 makes it possible for the latter to deform under the action of the deforming member. The mould 14 is also supple to favour the confinement of the material in the mould under the effect of the low pressure in the envelope 12. The suppleness of the mould provides a better contact between the mould 14 and the material to be moulded.

The envelope 12 is provided with the vacuum port 16. Preferably, the vacuum port 16 is mounted on the upper envelope 121. The envelope rests on a surface by virtue of its lower part 122; because the mould rests on the lower part, it is preferable to mount the vacuum port on the upper envelope 121 of the envelope to improve the quality of the low pressure.

The device may also comprise at least one film 20 (or drain) in the envelope. The film 20 favours the creation of the low pressure. Indeed, the film 20 makes it possible to avoid local adhesion of the envelope 12 to the mould 14, under the effect of the low pressure created within the envelope, imprisoning air bubbles; the local adhesion of the envelope 12 to the mould 14 hinders pursuit of the creation of the low pressure. The film 20 prevents local adhesion of the envelope 12 to the mould 14, which allows the low pressure to be effected correctly. As an example, the film 20 is of woven or non-woven material. Such a material is not air tight but allows the passage of air; while the low pressure is being made, the film favours the circulation of air in the direction of the vacuum port 16. The film 20 is for example located between the upper part 121 of the envelope 12 and the upper shell 141 of the mould 14. The film 20 then favours the circulation of the air between this part 121 and the shell 141. Alternatively, the film 20 may be between the lower part 122 of the envelope 12 and the lower shell 142 of the mould. The film also favours the circulation of the air between these elements; the circulation is all the more favoured when, due to gravity, the lower shell 142 rests against the lower part 122 and the low pressure is difficult to create in this zone of the envelope because air bubbles risk being imprisoned between the mould 14 and the envelope 12. The film 20 makes it possible to create a buffer zone between the mould and the envelope. The film 20 facilitates the circulation of the air between the lower shell 142 and the lower part 122 of the envelope. Preferably, the device 10 comprises two films 20 (or drains) in the envelope, one of the films 20 being between the upper part 121 and the upper shell 141 and the other film 20 being between the lower part 122 and the lower shell 142. The presence of two films 20 favours the creation of the vacuum in the entire envelope.

It is also possible to envisage providing one film 22 (or drain) in the mould 14. The film 22 then favours the low pressure in the mould. Indeed, the low pressure created in the envelope also propagates in the mould, the creation of the low pressure in the envelope also occurs in the mould, through the edges of the shells 141 and 142; nonetheless, the low pressure in the mould is less important, as the material to be moulded will not be aspirated at the same time. The film 22 in the mould also favours the circulation and aspiration of the air contained in the mould. The air contained in the mould is principally found between the material to be moulded and the upper shell 141 of the mould; the film 22 is therefore preferably located in this zone, avoiding that the shell 141 be pressed against the material, but rather that the film also allows circulation of air between the shell and the material when the low pressure is created within the envelope. The film 22 may be of the same material as the film 20, allowing the air to circulate.

The deforming member 18 makes it possible to conform the mould according to a desired shape so as to mould the material according to a particular shape. One sole deforming member is sufficient to conform the mould, for example by deforming a central zone of the mould; preferably, a plurality of deforming members are implemented, so as to deform the mould 14 in several zones. In the text that follows, the device will be described with several deforming members but the same remarks apply if a sole deforming member is present.

The deforming members 18 of the mould 14 are under the mould 14. At rest, the mould rests flat, and, when the deforming members are activated, they deform the mould 14 against gravity. The advantage is that the practical embodiment of the deformation is simpler to do than if the mould were maintained vertical and the members deformed the mould laterally, as is the case in the document WO2006/048652. In this last document, a problem arises to effectively maintain the material in place in the mould, while the mould is maintained vertically; the risk is that the material could flow within the mould and the thickness of the material would vary.

More specifically, the deforming members 18 act on the envelope 12. The members 18 are in contact with the envelope; by the action of the envelope, the mould, 14 is deformed. The advantage is that the risks of piercing the mould are reduced, inasmuch as a double protection is provided by the envelope 12 and the mould 14. The deforming members 18 are therefore equally located under the envelope 12; the action of the envelope 12 and the deformation of the mould 14 are done against gravity, by lifting or supporting the envelope 12 and the mould 14.

Figure 2:
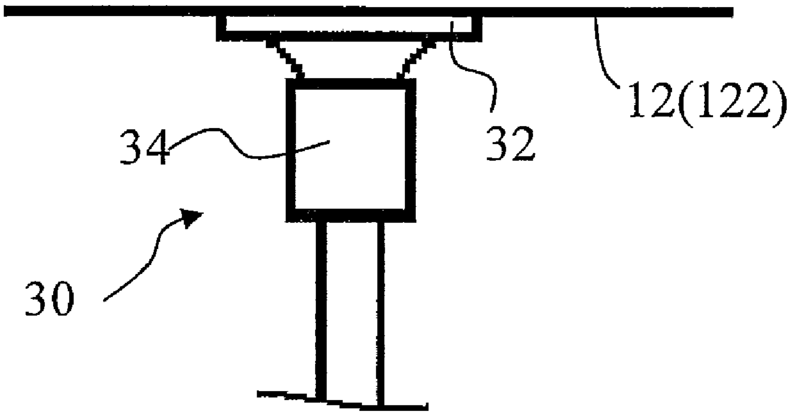
FIG. 2, a diagrammatic representation of a ball joint.

The device 10 may further comprise ball joints 30 between the deforming members 18 and the envelope 12. The ball joints improve the bond between the deforming members 18 and the envelope 12 deformed under the action of the members 18. FIG. 2 shows a diagrammatic representation of a ball joint 30. The ball joint 30 allows the rotation around three orthogonal axes of the surface element of the envelope as regards the corresponding deforming member 18. Indeed, while the member 18 acts on the envelope 12, the latter is submitted to displacements related to the member 18. In particular, the device comprises a disk 32 between the ball joint 30 and the envelope 12. The ball joint 30 then allows rotation around three axes of the disk 32.

The disk 32 makes it possible to reinforce the envelope 12 so as to reduce even more the risks of tearing the envelope 12 and hence the mould 14. The disk 32 may be moulded in the envelope 12, in particular in the lower part 121 of the envelope. The disk is hence integral with the envelope. The disk 32 may also be simply intercalated between the ball joint and the member 18; this makes it possible to more easily adapt to a more random layout of the members.

According to FIG. 2, to allow for the rotation of the disk 32 or the surface element of the envelope, the ball joint 30 may comprise a deformable stud 34. The stud 34 is for example of rubber. The stud 34 hence allows articulation of the disk 32 or surface element of the envelope 12 relative to the deforming member 18. The construction of the ball joint 30 is simple.

The device 10 may further comprise a table 24. The envelope 12 at rest is on the table. This facilitates the introduction of the material to be moulded in the device 10. Indeed, while the lower part 122 of the device 10 rests on the table 24 and the lower shell 142 rests on the part 122, it is possible to spread the material easily on the lower shell 142. The deforming members 18 extend through the table 24. When the device 10 is activated, the deforming members 18 lift the envelope 12 from the table. The members 18 lift the envelope 12 locally so as to create locally a deformation of the mould 14. The members 18 are for example jacks. The jacks extend from underneath the table 24 into contact with the envelope 12, through the table 24. The table 24 comprises openings 26 allowing the passage of the members 18. The deforming members 18 may also be more simply metallic rods, whose height is adjusted by intercalating wedges between the base of the rod and the ground. The advantage of using jacks is that the shapes that may be obtained are infinite, it being understood that the jacks may occupy varying positions.

The deforming member may also be a template; the advantage is that it is easier to reproduce a given shape for the envelope 12 and the mould 14. The template is a model supporting the envelope and the mould. By placing the envelope and the mould on the template, the template acts on the envelope so as to deform the mould. The template, for example, has the shape of a horse saddle, a sphere, a curved surface, etc.

The device makes it possible to obtain deformations of parts that, at rest, may measure approximately 5 $m^2$ (as an example). The deforming members 18 are regularly distributed or not under the surface of the envelope 12. Preferably the members 18 are regularly distributed in a grid; this allows for better control of the deformation of the mould. In the case of a deforming member in the form of a template, the surface of the template is naturally distributed against the envelope.

The invention also relates to a process for the production of parts. The parts may be of concrete, preferably of high performance fibred concrete as will be better described in the following. This type of concrete allows the production of thin parts of a few millimetres. The process comprises a step of supplying the envelope 12 and the mould 14. The process then comprises a step of introduction of the material to be moulded in the mould 14. The process then comprises a step of disposing the mould in the envelope. The envelope 12 is closed and a low pressure is created in the envelope. The low pressure in the envelope 12 may also propagate in the mould 14, attention being focused on the fact that the material does not escape from the mould 14. The process then comprises a step of deforming the mould. The material dries (or sets) at the same time as the mould is maintained deformed. Hence, a part with a specific shape is obtained, which can offer an aesthetic aspect to a structure. Preferably, the process is repeated, so as to obtain a plurality of parts with a specific shape; the parts may then be assembled so that the obtained jigsaw provides an aesthetic impression. The process particularly makes it possible to mould parts which have a low thickness (for example of 15 mm). Indeed, the process makes it possible to control the thickness of the material during the process.

The step of supplying the mould 14 and the envelope 12 may further comprise the supply of the table 24; the lower part 122 of the envelope may first be disposed on the table 24. The mould is put in the envelope in the sense that, during an initial period, only the lower shell 142 is then disposed on the part 122. The lower part 122 and the shell 142 lie flat. This arrangement facilitates the introduction step of the material to be moulded in the mould and the spreading of the material over the whole surface of the mould; in particular, this makes it possible to better control the thickness of the material. The mould 14 and the envelope 12 being arranged horizontally, the material to be moulded does not flow inside the mould 14. Advantageously, it is possible to lay a film 20 on the lower part 122, before placing the lower shell 142. This favours the creation of the low pressure within the envelope. Once the material has been placed on the lower shell 142, the mould 14 is closed by placing the upper shell 141 on the lower shell 142. Advantageously, a film 22 is laid between the material and the upper shell 141. The film 22 favours the propagation of the low pressure within the mould 14. The film 22 also provides a better appearance of the material once the process is completed; indeed, the film 22 reduces the risk of imprisoning air bubbles in the mould, which would give a cracked appearance on the surface of the part to be moulded. Then the envelope 12 is closed on the mould 14, by placing the upper part 121 of the envelope 12 on the upper shell 141. Advantageously, it is possible to place a film 20 between the upper part 121 and the upper shell 141; this film 20 also favours the creation of the low pressure and equally reduces the risk of imprisoning air bubbles in the envelope, these air bubbles having the harmful effects previously described.

Once the mould is confined in the envelope, a low pressure is created in the envelope. The envelope 12 takes on the shape of the mould 14 containing the material to be moulded. Under the effect of the low pressure, the envelope is pushed against the mould (optionally by the films, if necessary). This low pressure may propagate within the mould. The advantage of such a low pressure is that one obtains a biscuit, comprising the envelope and the mould confining the material to be moulded, which is sufficiently rigid so that the material does not flow in the mould, but that is also sufficiently supple to be submitted to a deformation by the deforming members. Another advantage is that the material confined in the mould maintains a substantially constant thickness during the production process, which makes it possible to obtain a part moulded to a substantially constant thickness.

The deformation of the mould may be effected by the action of the deforming members on the envelope. According to the desired shape of the part to be obtained, the deforming members are adjusted independently of each other. The deforming members 18 more or less act on the envelope 12; the members 18 more or less lift the envelope 12, independently of each other. Alternatively, the envelope and mould pair may be placed on a template, and the deformation of the mould may be effected by taking on the shape of the template.

After a predetermined period of time, the part is removed from the mould; the obtained part has a surface comprising bumps and hollows. The obtained part is a tri-dimensional object with a locally variable curvature; the curvature may locally have a positive or negative sign. Preferably, there is no singularity or discontinuity. If a sole deforming member 18 is implemented, as shown on FIG. 1, the surface may comprise only one hump; if several members 18 are used, then the surface may comprise a plurality of humps more or less high and separated by hollows. The humps correspond to the locations of the members 18 acting on the envelope, while the hollows correspond to the locations where there are no deformation members. The surface of the part is similar to the surface of a rough sea. Likewise, if the deforming member is a template, a desired shape is given to the template beforehand that will be taken by the envelope and mould ensemble.

The previously described process provides for the production of a part by moulding; it is possible to consider that the process be repeated so as to produce several parts by moulding, then assemble these parts between themselves. The parts to be assembled are then modules. The surface hence produced is itself a tri-dimensional object with a locally variable curvature; the curvature may locally have a positive or negative sign. Preferably there is no singularity or discontinuity. The process then provides for the production of a larger surface (for example 8000 $m^2$) by production of smaller parts (for example up to 20 $m^2$, preferably 5 $m^2$). One should proceed in such a way that the deforming members act in the same manner on the edges of two parts destined to be contiguous in the assembly so as to be able to assemble the parts between themselves by their edges and that the obtained assembly be continuous from one part to the other. The advantage of the device and the process is that the obtained and assembled parts are thin, therefore relatively less heavy.

The material used to produce the part by the process and the device is preferably ultra-high performance fibred concrete (abbreviated to UHPFC). This part is for example from 5 to 50 mm in thickness, which makes it possible to obtain very thin parts; preferably the part is 15 mm in thickness.

The ultra-high performance fibred concretes are concretes with a cement matrix comprising fibres. Reference should be made to the document <<Bétons fibrés à ultra-hautes performance>> from the <<Service d'études techniques des routes et autoroutes>> (Setra) and the <<Association Française de Génie Civil>> (AFGC). The compressive strengths of these concretes are generally above 150 MPa, even 250 MPa. The fibres are metallic, organic or a mixture thereof. The dosage of binder is high (The W/C is low; generally the W/C is at the most approximately 0.3).

The cement matrix generally comprises cement (Portland), an element with a pozzolanic reaction (notably silica fume) and a fine sand. The respective dimensions are selected intervals, according to the nature and respective amounts. For example, the cement matrix may comprise:

Portland cement
fine sand
an element of the silica fume type
optionally quartz flour
the amounts being variable and the dimensions of the different elements being selected from the micron and submicron range and the millimetre, with a maximum dimension not generally exceeding 5 mm
a superplasticizer being generally added with the mixing water.

As an example of a cement matrix, those described in the patent applications EP-A-518777, EP-A-934915, WO-A-9501316, WO-A-9501317, WO-A-9928267, WO-A-9958468, WO-A-9923046, WO-A-0158826 may be mentioned, in which further details may be found.

The fibres have length and diameter characteristics such that they effectively confer mechanical characteristics. Their amount is generally low, for example from 1 to 8% in volume.

Examples of a matrix are RPC, Reactive Powder Concretes, while the examples of UHPFC are BSI by Eiffage, Ductal® by Lafarge, Cimax® by Italcementi and BCV by Vicat.

Specific examples are the following concretes:

1) those resulting from mixtures of a—a Portland cement selected from the group consisting of the ordinary Portland cements called "CPA", the high performance Portland cements called "CPA-HP", the high performance and rapid setting Portland cements called "CPA-HPR" and the Portland cements with a low level of tricalcium aluminate (C3A), of the normal or high performance and rapid setting types;

b—a vitreous micro silica wherein the particles have for a major part a diameter of 100 Å-0.5 micron, obtained as a by-product in the zirconium industry, the proportion of this silica being from 10 to 30 weight % of the weight of the cement;

c—a water-reducing superplasticizer and/or fluidizing agent in an overall proportion from 0.3% to 3% (weight of the dry extract relative to the weight of the cement);

d—a quarry sand comprising particles of quartz which have for a major part a diameter of 0.08 mm-1.0 mm;

e—optionally other admixtures.

2) those resulting from the mixture of:

a—a cement with a particle size corresponding to a mean harmonic diameter or equal to 7 μm, preferably from 3 to 7 μm;

b—a mixture of calcined bauxite sands with different particle sizes, the finest sand having an average particle size lower than 1 mm and the coarsest sand having an average particle size lower than 10 mm;

c—silica fume wherein 40% of the particles have a dimension lower than 1 μm, the mean harmonic diameter being about 0.2 μm, and preferably 0.1 μm;

d—an anti-foaming agent;

e—a water-reducing superplasticizer;

f—optionally fibres;

and water;

the cements, the sands and the silica fume presenting a particle size such that there are at least three and at most five different particle size classes, the ratio between the mean harmonic diameter of one particle size class and the class immediately above being approximately 10.

3) those resulting from the mixture of:

a—a Portland cement;

b—granular elements;

c—fine elements with a pozzolanic reaction;

d—metallic fibres;

e—dispersing agent;

and water;

the preponderant granular elements have a maximum particle size D at most equal to 800 micrometers, wherein the preponderant metallic fibres have an individual length L of 4 mm-20 mm, wherein the ratio R between the average length L of the fibres and the aforesaid maximum size D of the granular elements is at least equal to 10 and wherein the quantity of preponderant metallic fibres is such that the volume of these fibres is from 1.0% to 4.0% of the volume of the concrete after setting.

4) those resulting from the mixture of:

a—100 p. of Portland cement;

b—30 to 100 p., or better 40 to 70 p., of fine sand having a particle size of at least 150 micrometers;

c—10 to 40 p. or better 20 to 30 p. of amorphous silica having a particle size lower than 0.5 micrometers;

d—20 to 60 p. or better 30 to 50 p., of ground quartz having a particle size lower than 10 micrometers;

e—25 to 100 p., or better 45 to 80 p. of steel wool;

f—a fluidizer, g—13 to 26 p., or better 15 to 22 p., of water.

Thermal curing is included.

5) those resulting from the mixture of:

a—cement;

b—granular elements having a maximum particle size Dmax of at most 2 mm, preferably at most 1 mm;

c—elements with a pozzolanic reaction having an elementary particle size of at most 1 μm, preferably at most 0.5 μm;

d—constituents capable of improving the toughness of the matrix selected from acicular or plate-like elements having an average size of at most 1 mm, and present in a volume proportion from 2.5 to 35% of the combined volume of the granular elements (b) and the elements with a pozzolanic reaction (c);

e—at least one dispersing agent and meeting the following conditions:

(1) the weight percentage of water W relative to the combined weight of the cement (a) and the elements (c) is 8-24%; (2) the fibres present an individual length L of at least 2 mm and a ratio L/phi, phi being the diameter of the fibres, of at least 20; (3) the ratio R between the average length L of the fibres and the maximum particle size Dmax of the granular elements is at least 10; (4) the quantity of fibres is such that their volume is lower than 4% preferably than 3.5% of the volume of concrete after setting.

6) those resulting from the mixture of:

a—cement;

b—granular elements;

c—elements with a pozzolanic reaction having an elementary particle size of at most 1 μm, preferably at most 0.5 μm;

d—constituents capable of improving the toughness of the matrix selected from acicular or plate-like elements having an average size of at most 1 mm, and present in a volume proportion from 2.5 to 35% of the combined volume of the granular elements (b) and the elements with a pozzolanic reaction (c);

e—at least one dispersing agent and meeting the following conditions:

(1) the weight percentage of the water W relative to the combined weight of the cement (a) and the elements (c) is in the range 8-24%; (2) the fibres have an individual length L of at least 2 mm and a ratio L/phi, phi being the diameter of the fibres, of at least 20; (3) the ratio R between the average length L of the fibres and the particle size D75 of all the constituents (a), (b), (c) and (d) is at least 5, preferably at least 10; 4) the quantity of fibres is such that their volume is lower than 4% and preferably than 3.5% of the volume of the concrete after setting; (5) all the constituents (a), (b), (c) and (d) having a particle size D75 of at most 2 mm, preferably of at most 1 mm, and a particle size D50 of at most 200 μm, preferably of at most 150 μm.

7) those resulting from the mixture of:

a—cement;

b—granular elements having a maximum particle size D of at most 2 mm, preferably of at most 1 mm;

c—fine elements with a pozzolanic reaction having an elementary particle size of at most 20 μm, preferably of at most 1 μm;

d—at least one dispersing agent;

and meeting the following conditions: (e) the weight percentage of the water relative to the combined weight of the cement (a) and the elements (c) is from 8 to 25%; (f) the organic fibres have an individual length L of at least 2 mm and a ratio L/phi, phi being the diameter of the fibres, of at least 20; (g) the ratio R between the average length L of the fibres and the maximum particle size D of the granular elements is at least 5, h) the quantity of fibres is such that their volume represents at most 8% of the volume of the concrete after setting.

8) those resulting from the mixture of:

a—cement;

b—granular elements;

c—elements with a pozzolanic reaction having an elementary particle size of at most 1 μm, preferably of at most 0.5 μm;

d—at least one dispersing agent;

and meeting the following conditions: 1) the weight percentage of the water W relative to the combined weight C of the cement (a) and the elements (c) is in the range 8-24%; (2) the fibres have an individual length L of at least 2 mm and a ratio L/phi, phi being the diameter of the fibres, of at least 20; (3) the ratio R between the average length L of the fibres and the particle size D75 of all the constituents (a), (b) and (c) is at least 5, preferably at least 10; (4) the quantity of fibres is such that their volume is at most 8% of the volume of the concrete after setting; (5) all the constituents (a), (b) and (c) have a particle size D75 of at most 2 mm, preferably at most 1 mm, and a particle size D50 of at most 150 μm, preferably at most 100 μm.

9) those resulting from the mixture of:

a—at least one hydraulic binder from the group consisting of the Portland cements class G (API), the Portland cements class H (API) and other hydraulic binders with low levels of aluminates, b—a micro silica with a particle size of 0.1 to 50 micrometers, at a rate of 20 to 35 weight % relative to the hydraulic binder, c—an addition of medium mineral and/or organic particles, with a particle size of 0.5-200 micrometers, at a rate of 20 to 35 weight % relative to the hydraulic binder, the quantity of the aforesaid addition of average particles being less than or equal to the quantity of micro silica, a superplasticizing agent and/or a water-soluble fluidizer in a proportion of 1% to 3 weight % relative to the hydraulic binder, and water in an amount at the most equal to 30 weight % of the hydraulic binder.

10) those resulting from the mixture of:

a—cement;

b—granular elements having a particle size Dg of at most 10 mm;

c—elements with a pozzolanic reaction having an elementary particle size from 0.1 to 100 μm;

d—at least one dispersing agent;

e—metallic and organic fibres;

and meeting the conditions: (1) the weight percentage of water relative to the combined weight of the cement (a) and the elements (c) is in the range 8-24%; (2) the metallic fibres have an average length Lm of at least 2 mm, and a ratio Lm/d1, d1 being the diameter of the fibres, of at least 20; (3) the ratio Vi/V of the volume Vi of the metallic fibres to the volume V of the organic fibres is greater than 1, and the ratio Lm/Lo of the length of the metallic fibres to the length of the organic fibres is greater than 1; (4) the ratio R between the average length Lm of the metallic fibres and the size Dg of the granular elements is at least 3; (5) the quantity of metallic fibres is such that their volume is less than 4% of the volume of the concrete after setting and (6) the organic fibres have a melting temperature lower than 300° C., an average length Lo greater than 1 mm and a diameter Do of at most 200 μm, the amount of organic fibres being such that their volume is from 0.1 to 3% of the volume of the concrete.

A thermal cure can be done on these concretes. For example, the thermal curing comprises, after the hydraulic setting, heating to a temperature of 90° C. or more for several hours, typically 90° C. for 48 hours.

The process described may be implemented by the device previously described.

The invention claimed is:

1. A moulding device comprising:
- an envelope;
- a mould, the mould being in the envelope;
- a vacuum port to create a low pressure in the envelope; and
- a deforming member to deform the envelope and the mould.

2. The device according to claim 1, further comprising a film in the envelope.

3. The device according to claim 1, further comprising two films in the envelope, one film being above and one film being under the mould.

4. The device according to claim 1, further comprising a film in the mould.

5. The device according to claim 1, wherein the deforming member is below the mould.

6. The device according to claim 1, wherein the deforming member acts on the envelope.

7. The device according to claim 1, wherein the deforming member comprises a jack.

8. The device according to claim 1, further comprising a table, the envelope being on the table and the deforming member extending through the table.

9. The device according to claim 1, further comprising ball joints between the deforming member and the envelope.

10. The device according to claim 1, the deforming member being a template.

11. The device according to claim 1, wherein the mould is deformed by the deforming member against gravity.

12. The device according to claim 1, wherein the envelope is made of a supple material.

13. A production process comprising:
- providing an envelope and a mould;
- introducing a material to be moulded in the mould;
- disposing the mould in the envelope;
- creating a low pressure in the envelope; and
- deforming the envelope and the mould.

14. The process according to claim 13, wherein one or more films are disposed in the envelope, between the envelope and the mould.

15. The process according to claim 13, wherein after introduction of the material in the mould, a film is placed between the material to be moulded and the mould.

16. The process according to claim 13, comprising the supply of a deforming member selected from the group consisting of a jack and a template.

17. The process according to claim 13, the process being repeated so as to obtain several moulded parts, the process then comprising assembling the moulded parts.

18. The process according to claim 13, the process being implemented by a moulding device comprising:
- the envelope;
- the mould, the mould being in the envelope;
- a vacuum port to create a low pressure in the envelope; and
- a deforming member for the mould.

19. The process according to claim 13, wherein envelope is made of a supple material.

20. The device according to claim 1, wherein the deforming member is configured to act on an outer surface of the envelope to deform the envelope and the mould.

* * * * *